United States Patent
Cooke

(10) Patent No.: US 7,412,364 B2
(45) Date of Patent: Aug. 12, 2008

(54) RELATIVE GEOMETRY SYSTEM AND METHOD

(75) Inventor: Steven W. Cooke, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 737 days.

(21) Appl. No.: 10/192,979

(22) Filed: Jul. 10, 2002

(65) Prior Publication Data

US 2004/0008199 A1 Jan. 15, 2004

(51) Int. Cl.
*G06G 7/48* (2006.01)
*G06F 7/60* (2006.01)
(52) U.S. Cl. .............................. 703/6; 703/2
(58) Field of Classification Search ............ 703/6, 703/2; 342/357.08, 357.13
See application file for complete search history.

(56) References Cited

U.S. PATENT DOCUMENTS

| | | | | |
|---|---|---|---|---|
| 5,499,195 | A * | 3/1996 | Castelaz | 342/159 |
| 5,610,616 | A * | 3/1997 | Vallot et al. | 342/357.03 |
| 5,889,493 | A * | 3/1999 | Endo | 342/357.08 |
| 5,910,788 | A * | 6/1999 | Class | 342/357.02 |
| 6,053,736 | A * | 4/2000 | Huffman et al. | 434/11 |
| 6,067,041 | A * | 5/2000 | Kaiser et al. | 342/171 |

OTHER PUBLICATIONS

Wikipedia encyclopedia, "World Geodetic System, History of the World Geodetic System", 1984.*
Defense mapping agency Washington DC, "Department of Defense World Geodetic System 1984: Its Definition and Realtionship with Local Geodetic Systems. Second Edition.", abstract, 1991.*
Reddy et al., "TerraVision II : Visualizing Massive Terrain Databases in VRML", IEEE, 1999.*
Leclerc et al., "Digital Earth: Building the new World", SRI International, 1999.*
Lindstrom et al.; Visualization of large terrains made easy; Proc. IEEE Visualization; Oct. 2001; pp. 11.*

* cited by examiner

*Primary Examiner*—Hugh Jones
(74) *Attorney, Agent, or Firm*—Lee & Hayes, PLLC

(57) ABSTRACT

A system, method, and computer program product for reducing processing time related to relative geometry calculations performed for objects in a simulated three-dimensional environment. The method converts three-dimensional location coordinates of each object of a plurality of simulated objects in the simulated three-dimensional environment to coordinates of a two-dimensional grid. Then, a two-dimensional grid area that is associated with the scan of an object is calculated. Objects with two-dimensional grid coordinates that are collocated with the calculated area of the scan are determined and relative geometry calculations for the scan of the object determined to be collocated with the calculated area of the scan is performed.

2 Claims, 4 Drawing Sheets

RELATIVE GEOMETRY SYSTEM AND METHOD

FIELD OF THE INVENTION

This invention relates generally to computer simulations and, more specifically, to three-dimensional computer simulations.

BACKGROUND OF THE INVENTION

Currently, relative geometry calculations are done between all players or objects in a real-time simulated three-dimensional environment. This represents suboptimal use of available processing resources and time because many objects have little or no interaction. This becomes a significant issue as the number of objects in the real-time simulated environment increases. Because relative geometry computations grow in terms of the square of the number of entities, simulations envisioned will grow into the thousands of entities. Therefore, performing relative geometry becomes a dominant cost of a simulation.

Therefore, there exist an unmet need to reduce the amount of relative geometry calculations performed in a simulation, and thus reduce the processing costs of the simulation.

SUMMARY OF THE INVENTION

The present invention provides a system, method, and computer program product for reducing the number of relative geometry calculations amongst multiple objects in a simulated three-dimensional environment. The present invention can be used to improve theatre warfare simulations, spatial or celestial simulations, three-dimensional interactive games, or any other simulations that entail objects in a three-dimensional environment knowing the position of other objects in the environment.

The present invention is a system and method for reducing processing time related to relative geometry calculations performed for objects in a simulated three-dimensional environment. The method converts three-dimensional location coordinates of each object of a plurality of simulated objects in the simulated three-dimensional environment to coordinates of a two-dimensional grid. Then, a two-dimensional grid area that is associated with the scan of an object is calculated. Objects with two-dimensional grid coordinates that are collocated with the calculated area of the scan are determined and relative geometry calculations for the scan of the object determined to be collocated with the calculated area of the scan is performed. Thus, relative geometry calculations are only performed on objects that have the greatest likelihood of having a location in the three-dimensional environment that is within another object's scan. By reducing the amount of relative geometry calculations that are performed, system cost are reduced because less processing needs to occur.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
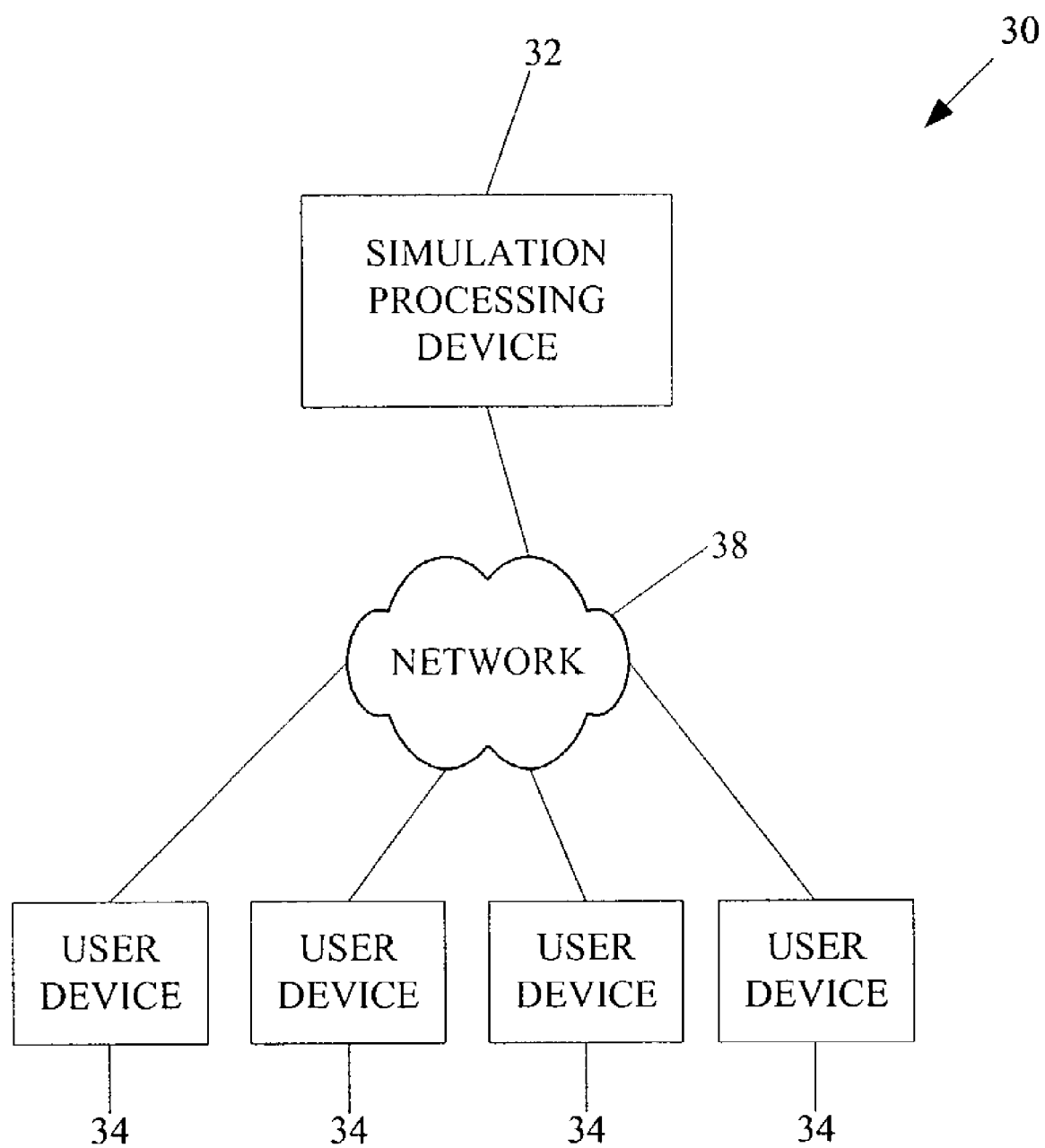
FIG. 1 is a block diagram of an exemplary system that performs the present invention.

FIG. 1 illustrates an exemplary simulation system 30 for generating a three-dimensional simulation. The simulation system 30 includes a simulation processing device 32 and a plurality of user simulation devices 34 coupled to the simulation processing device 32 over a public or private data network 38. Each user simulation device 34 controls one or more objects that are present in a simulated three-dimensional environment that is generated and maintained by the simulation processing device 32. The simulation processing device 32 also maintains the location and status of objects not associated with a user simulation device 34. The user simulation devices 34 are suitably computer-based systems that include a user interface (not shown) for controlling the object or objects associated with the user simulation device 34 and a display (not shown) for presenting results of a sensor scan, if the associated object performs a scan within the simulated three-dimensional environment. The device 34 can be associated with a plurality of different types of sensor scans.

Types of scans include a simulated visual scan, a simulated pencil beam radar scan, a simulated fan beam radar scan, a visual scan, or any other type of scan. The simulation processing device 32 determines what other objects in the simulated three-dimensional environment appear within each object's scan. At periodic time intervals, the simulation processing device 32 performs the scan determination for all object scans in the simulated three-dimensional environment. The scan results are sent to the associated user simulation device 34 for presentation on the display. The process for performing the determination of whether objects are within each object's scan is described in the flow diagram of FIG. 2 and by example in FIGS. 3-4. As will be appreciated, the processing performed by the simulation processing device 32 and the plurality of user simulation devices 34 can be distributed to one or more other devices over the network 38 or over another network. Non-limiting examples of devices 32 and 34 are general purpose computers.

Figure 2:
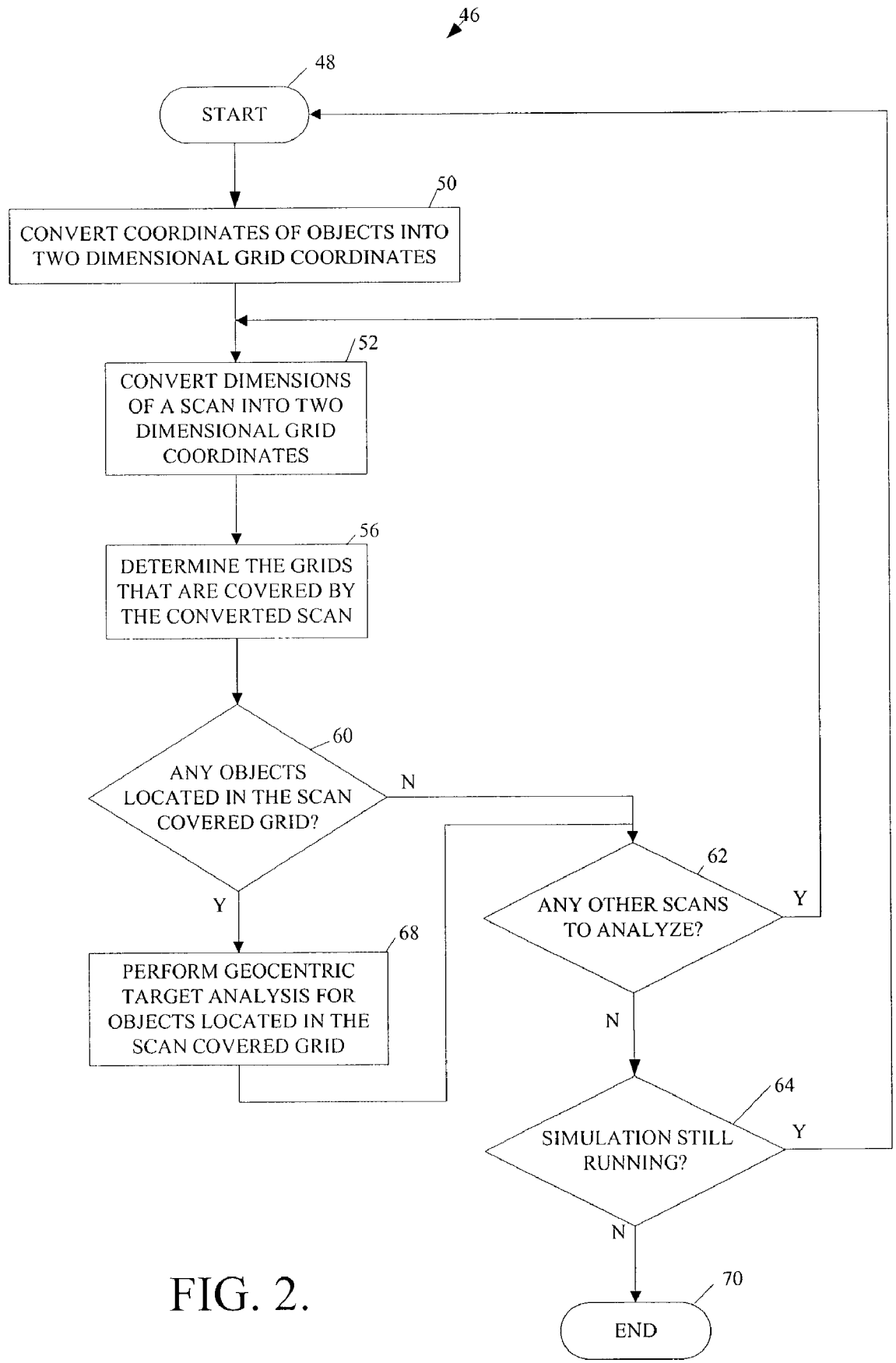
FIG. 2 is a flow diagram illustrating an exemplary process of relative geometry calculation in accordance with the present invention.

FIG. 2 illustrates an exemplary process 46 performed by the simulation processing device 32 as shown in FIG. 1 or by any other device which is controlling a simulated three-dimensional environment that includes a plurality of interacting objects. The simulation processing device 32 maintains the position status of all objects within the simulated three-dimensional environment based on position values relative to three orthogonal axes (X, Y, Z) that all have their origin at the center of the earth, i.e. geocentric coordinates such as described by the World Geodetic System-84 (WGS-84). In other words, object positions are defined by geocentric coordinates.

The process 46 begins at a block 48. At block 50, the simulation processing device 32 or a component of the simulation application program running on a user simulation device 34 converts the geocentric coordinates of each object into coordinates of a two-dimensional grid. The two-dimensional grid is a predefined planar grid that is suitably tangent with the earth at a geocentric point on the surface of the earth. It will be appreciated that two-dimensional grids at other locations relative to the earth can be used. The predefined tangent point for the two-dimensional grid is selected based on an approximate center location of all the objects within the simulated three-dimensional environment. Some of the objects perform a scan of the simulated three-dimensional environment. Each scan occupies a volume of space in the simulated three-dimensional environment. At a block 52, each scan volume is converted into an area on the two-dimensional grid. Converting a three-dimensional scan volume into the two-dimensional grid depends on the type of scan. If the scan is a visual scan, the range value of the scan converts to a circular area around the object's two-dimensional grid location according to a predefined scan range value. For the pencil and fan beam scans, the location in geocentric coordinates of the end of the scan's line-of-sight is known based on a predefined scan range value and a geocentric line-of sight direction vector. The end of the line-of-sight is convened into two-dimensional grid coordinates. Then, an approximate two-dimensional shape of the end of the scan is determined based on a known beam width angle for a pencil beam scan and a beam width angle and an elevation angle for the fan beam scan. The shape of the end of the scan is connected to the origin of the scan for approximately defining the area that the scan covers in the two-dimensional grid.

At a block 56, the simulation processing device 32 determines which grid areas in the two-dimensional grid are fully or partially covered by the area of a two-dimensional representation of the scan. A non-limiting example of performing this covered grid determination is by creating a table for each row of the grid with two columns. Each of the lines that define the scan in two dimensional grid coordinates are analyzed to determine what grid areas they pass through. For each row of the grid the left most and right most grid areas are determined based on the analyzed lines.

Then, at a decision block 60, the simulation processing device 32 determines if any other objects with two-dimensional grid locations are within the two-dimensional grid area that is fully or partially covered by the scan. If there are objects located in grid areas fully or partially covered by the scan, the simulation processing device 32 performs target analysis in geocentric coordinates for those objects, at a block 68. At a decision block 62, once all the objects sharing the same two-dimensional grid areas with the scan have been processed or if no objects were found in the area of the scan, as determined in the decision block 60, the simulation processing device 32 continues checking other scans for objects that could be possible targets of the scan. Once all the scans have been analyzed, then, at a decision block 64, a determination is made whether the simulation is still executing. If the simulation is still executing, then the process 46 returns to the block 48 for processing at a next time interval. If the simulation is no longer executing, the process 46 stops at a block 70. As will be shown and described in the example in FIGS. 3,4, the present invention quickly eliminates most unaffected objects in a simulated three-dimensional environment from having to go through a geocentric analysis (relative geometry calculation) for every scan.

Figure 3:
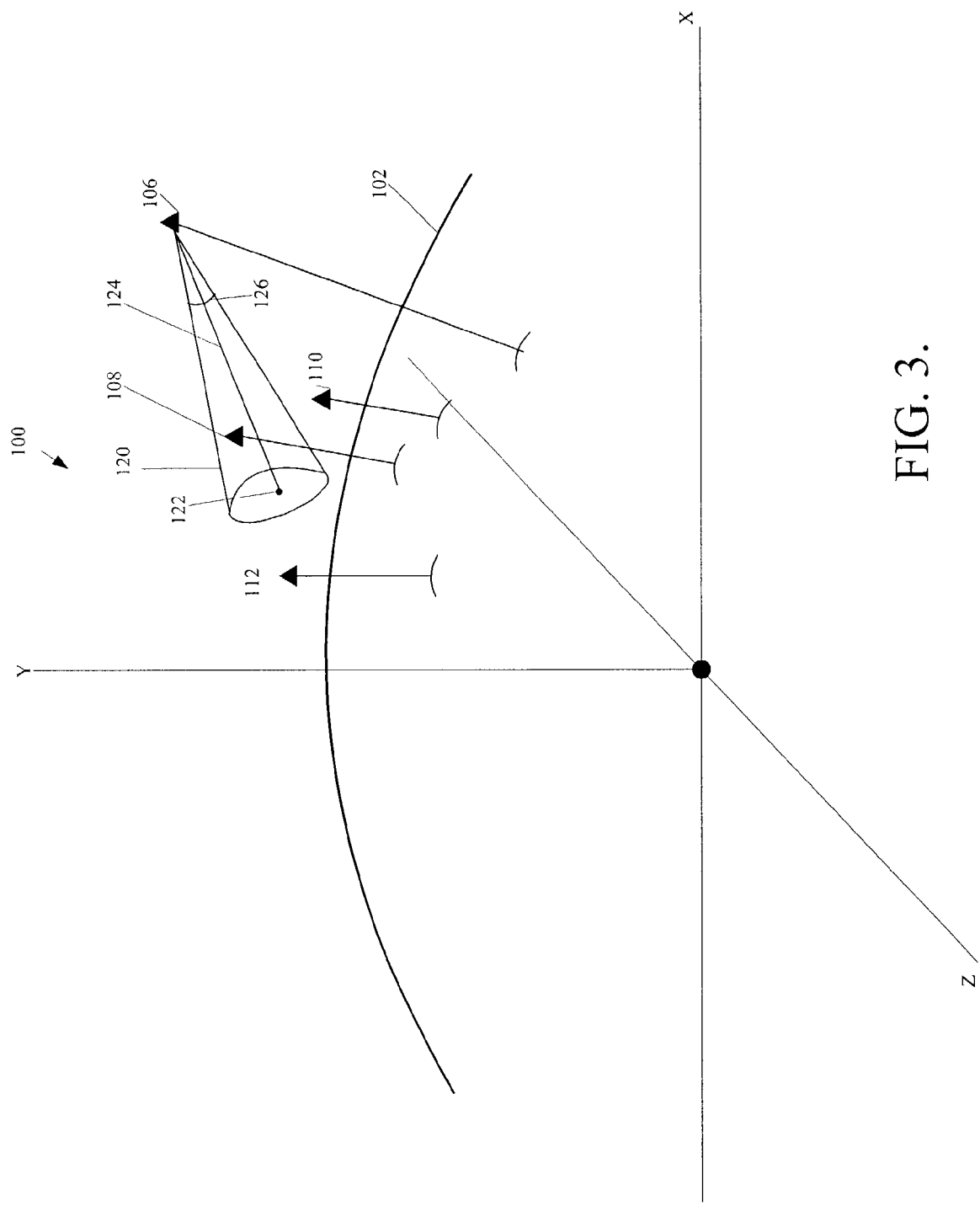
FIG. 3 is a view of any example simulated three-dimensional environment.
Figure 4:
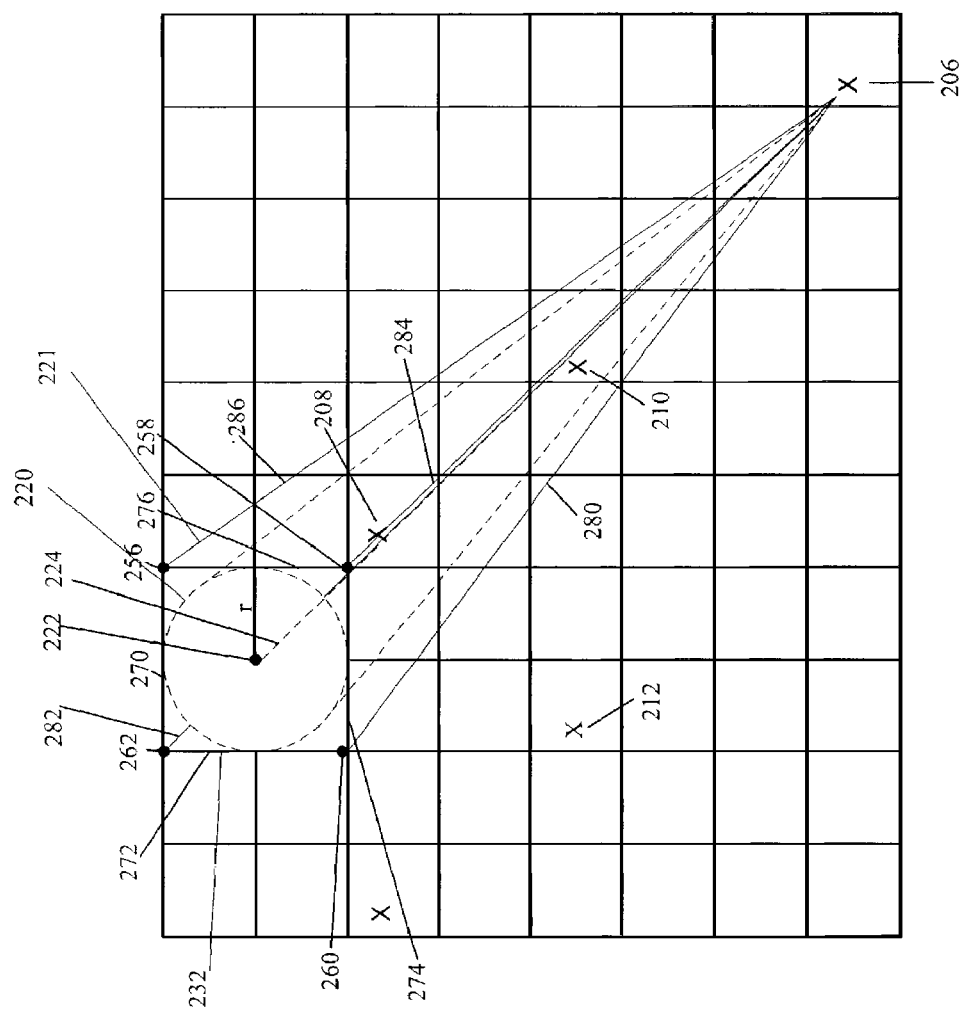
FIG. 4 shows a two-dimensional grid representation of the example environment shown in FIG. 3.

FIGS. 3 and 4 illustrate an exemplary simulation and a visual example of the processing performed at blocks 50, 52, 56, and 60 from FIG. 2. FIG. 3 illustrates a perspective view of a non-limiting example simulated three-dimensional environment 100 with a plurality of objects interacting in the environment 100 on or above a simulated curved earth surface 102. In the environment 100, each object includes geocentric coordinates relative to the X, Y, and Z axes. In this example, an object 106 includes a three-dimensional pencil beam scan pattern 120 that passes over but does not come in contact with an object 110. The scan pattern 120 does encompass an object 108.

FIG. 4 illustrates some of the objects shown in FIG. 3 at converted locations on a two-dimensional grid plane. A two-dimensional grid object 206 is the two-dimensional grid location for the object 106 from FIG. 3. The following are two-dimensional grid object and thee-dimensional grid object relationships:

Object 108=>Object 208
Object 110=>Object 210
Object 112=>Object 212

A scan outline 220 shows how the scan 120 produced by object 106 directly converts to the grid plane. The scan outline 220 in FIG. 4 is not directly converted into a shape in the grid plane. A two-dimensional scan area 221 that encompasses the scan outline 220 is determined. The following describes the construction of the area 221. The processing device 32 determines the location in the grid plane for an end point 122 of a line-of sight 124 for the scan 120 (FIG. 3). The end point 122 is defined in geocentric coordinates according to a known scan range value and the three-dimensional line-of-sight direction (vector) of the scan 120. After the geocentric coordinates for the end point 122 of the scan are determined, the end point 122 is mapped to the grid plane, (see end point 222; FIG. 4). A radius value r at the end point 222 is determined by multiplying the scan range (distance from scan source to the end point 122) by the sine of one-half the beam width angle 126 of the scan 120 (FIG. 3).

The beam width angle 126 is a preknown value of the scan 120. Then, the radius r is added to the X value of the location of the end point 222 to get an edge point 220. The radius r is added to the Y axis value of the edge point 220 to identify a first corner 256 of a box 232 that sufficiently encompasses the end of the pencil beam scan. The other corners 258, 260, and 262 of the box 232 are calculated by adding or subtracting the radius r to either the X or Y axis coordinates accordingly. The edge lines 270, 272, 274, and 276 of the box 232 are determined using the corners 256-262. The remaining boundaries of the area 221 are defined by lines 280, 282, 284 and 286 that traverse from the box corners 258-262 to the origin (object 206) of the scan. The scan area 221 (region of the scan) is defined by lines 270-276 and 280-286.

The simulation processing device 32 determines the grid regions that are fully or partially covered by lines 270-286. Then, the simulation processing device 32 determines if any objects have grid plane locations that are located in the fully or partially covered grid areas. Objects 208 and 210 are determined to be located within grid areas that are defined as being fully or partially covered by the lines 270-286. Therefore, because only objects 108 and 110 are identified within the two-dimensional scan area, they are the only objects within the simulated three-dimensional environment 100 that are further processed in geocentric coordinates to determine if the actual three-dimensional scan pattern 120 does target the object.

While the preferred embodiment of the invention has been illustrated and described, as noted above, many changes can be made without departing from the spirit and scope of the invention. Accordingly, the scope of the invention is defined by the appended clams and is not limited by the description of the preferred embodiment.

What is claimed is:

1. A computer system comprising:
   a plurality of user simulation devices, wherein each user simulation device is associated with an object displayed in a simulated three-dimensional environment, one or more of the user simulation devices comprising:
   a display device for displaying results of a scan emanating from the displayed object that is associated with the user simulation device; and a user interface device for allowing a user to enter object control signals for the displayed object;

a processor coupled to the plurality of user simulation device, the processor comprising:

a means for receiving object control signals from the user simulation devices;

a means for creating a simulated thee-dimensional environment based on received object control signals;

a means for converting three-dimensional location coordinates of each displayed object to coordinates on a two-dimensional grid;

a means for calculating an area in the two-dimensional grid of a scan that emanates from each displayed object;

a means for determining which displayed objects with two-dimensional grid coordinates are located in the calculated area of the scan;

a means for performing relative geometry calculations to determine updated multi-dimensional location coordinates for only the displayed objects determined to be located in the calculated area of the scan to determine movement of the displayed objects within the simulated three-dimensional environment; and a means for generating an output for each scan based on the performed associated relative geometry calculation;

wherein the generated output for the scan of the displayed object is sent to the associated user simulation device for display on the display device.

2. The computer system of claim 1 wherein the means for calculating is performed based on at least one of previously-known range information of the scan, previously-known line-of-sight information of the scan, previously-known beam width angle information of the scan, or previously-known beam elevation angle information of the scan.

* * * * *